Figure 1:
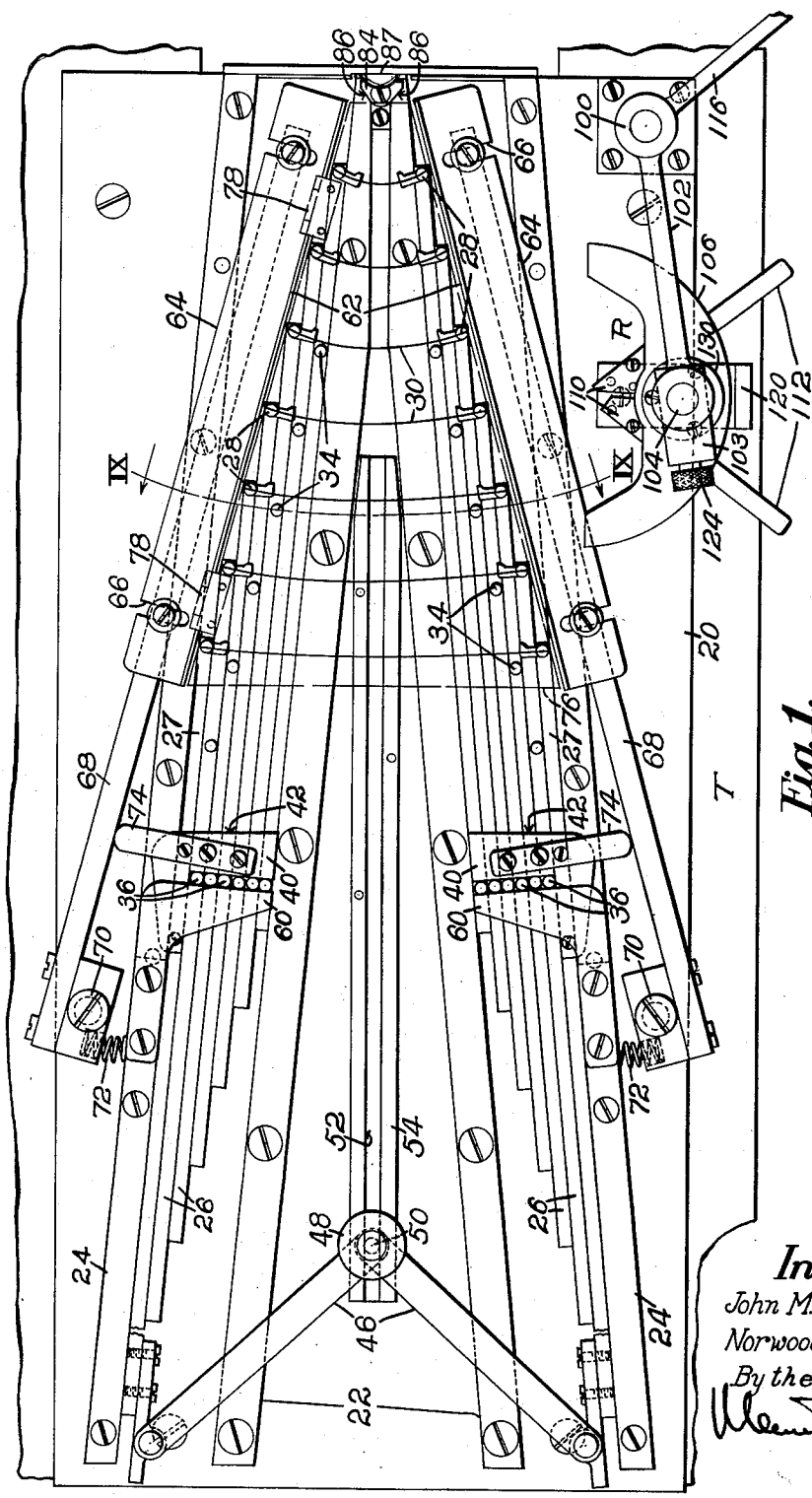

Inventors
John M. Whelton
Norwood H. Knowlton
By their Attorney

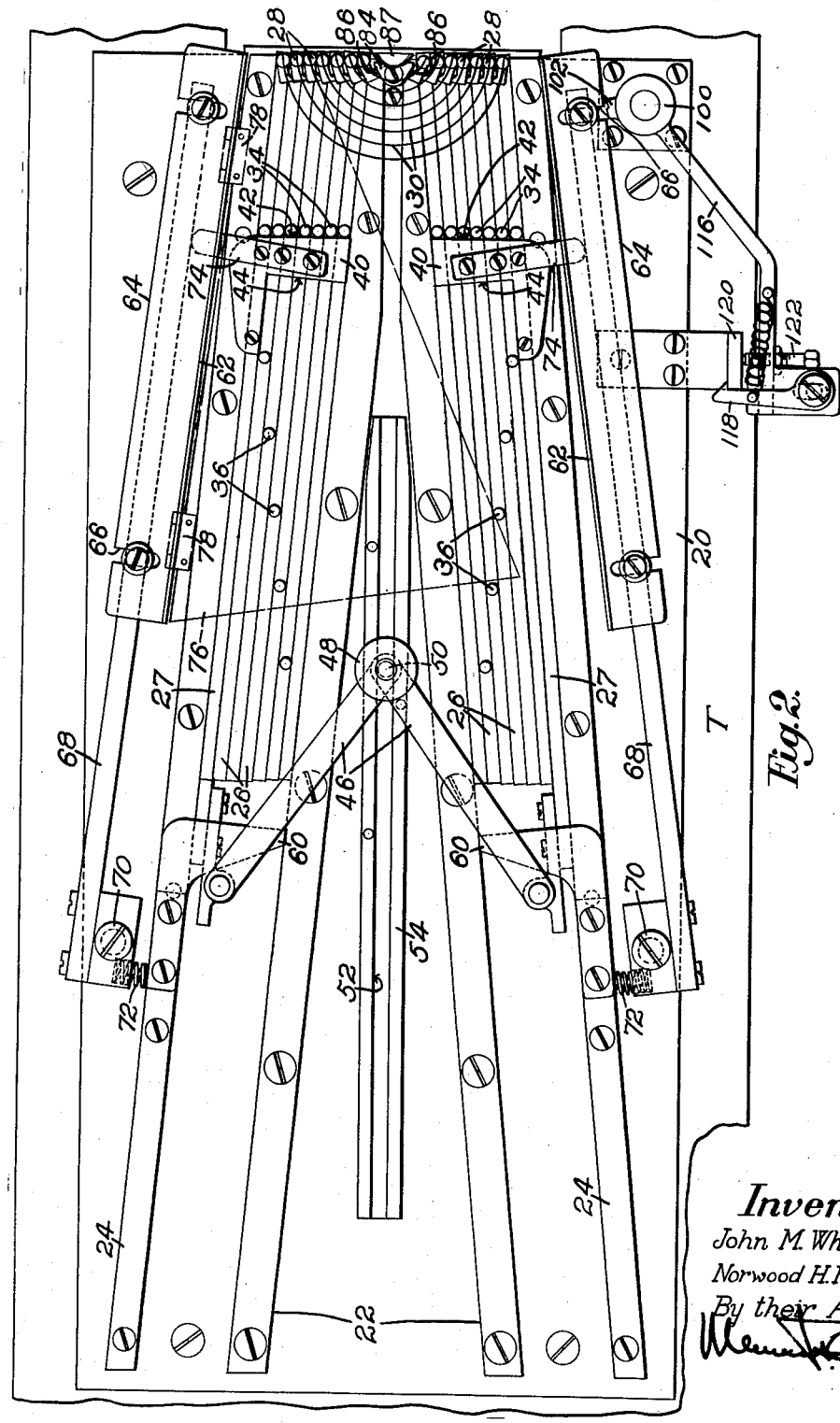

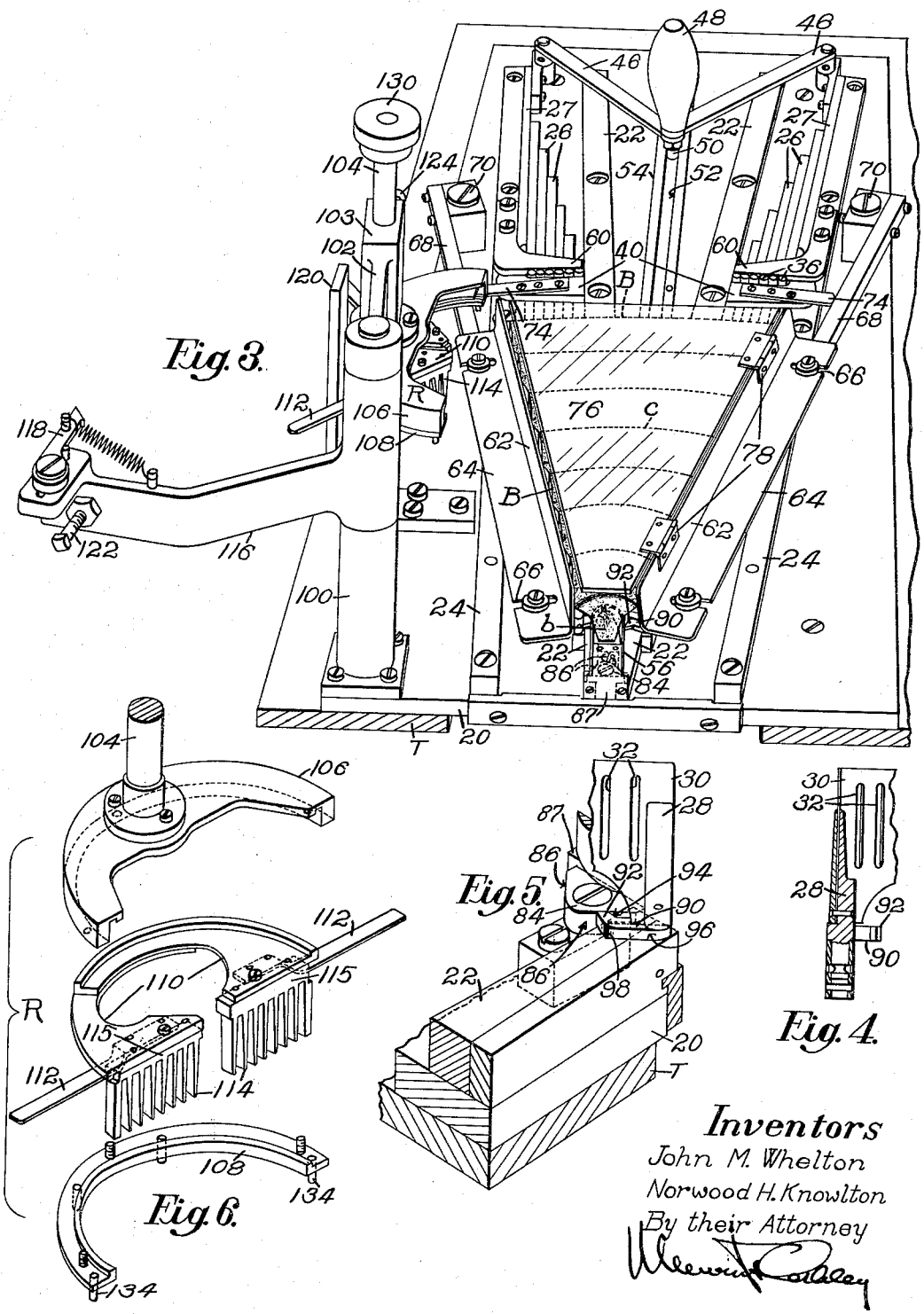

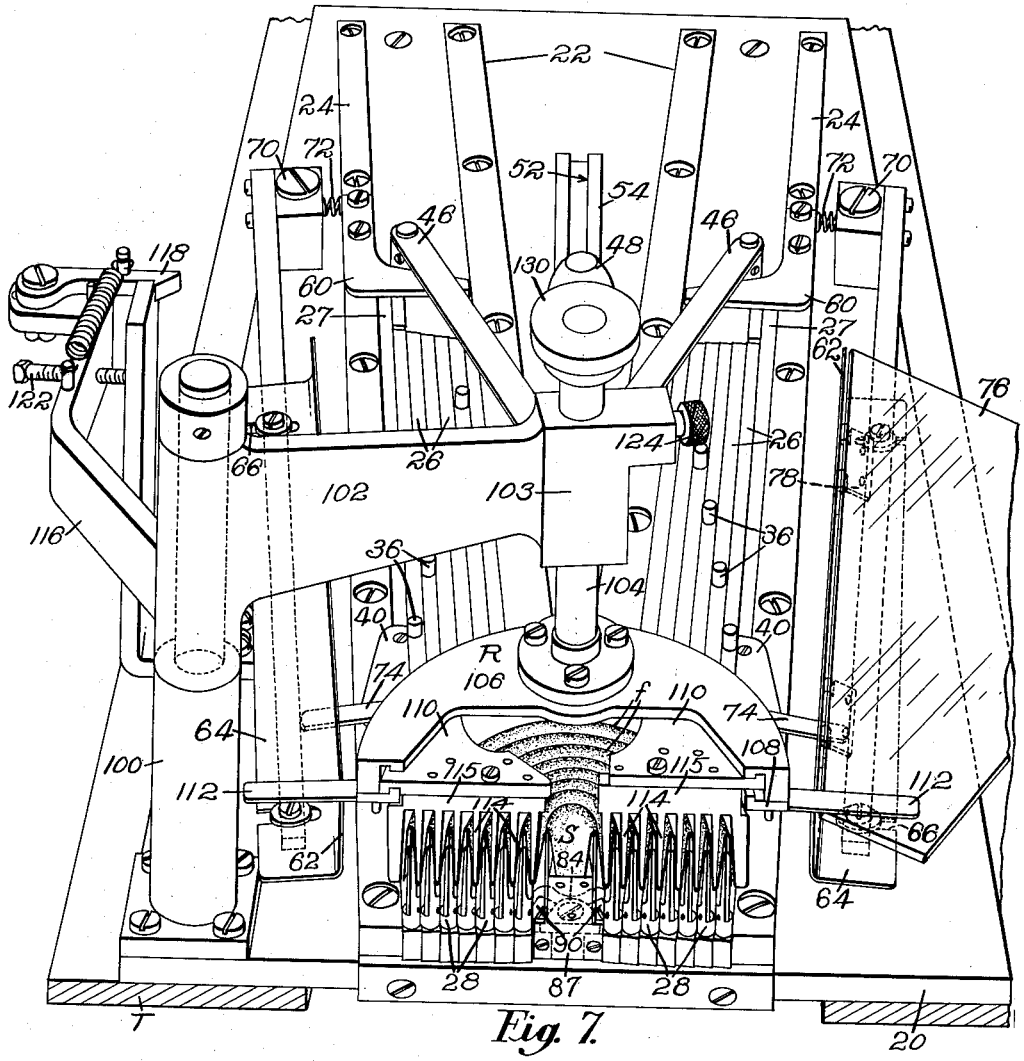
Fig. 7.
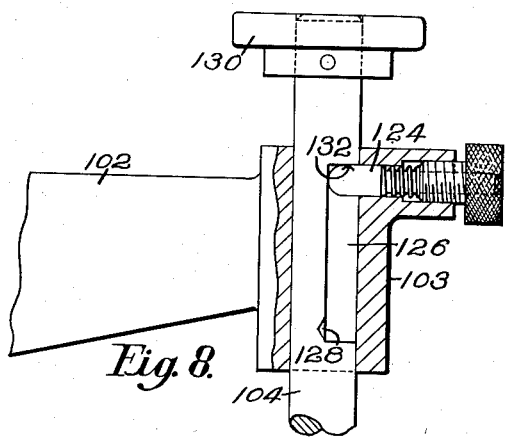
Fig. 8.
Inventors
John M. Whelton
Norwood H. Knowlton
By their Attorney

May 16, 1961  J. M. WHELTON ET AL  2,984,160
FOLDING APPARATUS
Filed Aug. 2, 1945  6 Sheets-Sheet 5

*Inventors*
John M. Whelton
Norwood H. Knowlton
By their Attorney

May 16, 1961  J. M. WHELTON ET AL  2,984,160
FOLDING APPARATUS
Filed Aug. 2, 1945  6 Sheets-Sheet 6

Inventors
John M. Whelton
Norwood H. Knowlton
By their Attorney

# United States Patent Office 2,984,160
Patented May 16, 1961

2,984,160

FOLDING APPARATUS

John M. Whelton, Peabody, and Norwood H. Knowlton, Rockport, Mass., assignors to United Shoe Machinery Corporation, Boston, Mass., a corporation of New Jersey Filed Aug. 2, 1945, Ser. No. 608,518

21 Claims. (Cl. 93—1)

This invention relates to apparatus for forming sheet material into folds, it being especially applicable to the production of filters to be contained in the canisters of gas-masks. Filters of this character have been formed by a series of flexible folding strips which, in their action, assume generally arcuate curves and simultaneously press portions of a blank between them to furnish a semicircular section. Two of these sections are cemented together at their diameters to complete the filter. An object of our invention is to effect the forming of a blank more accurately and in more symmetrical uniformly spaced folds than has heretofore been possible, and, when the article consists of folded sections, with said sections securely joined.

In the attainment of this object, as a feature of the invention, a series of movable strips, preferably flexible and spaced from one another to receive between them portions of a blank of material to be folded, are movable, one after another, to press the material between them into successive folds. The final fold may be formed against a stationary abutment. The blank is thus grasped as soon as the first fold is made, and is retained against displacement upon the strips during further forming. This causes each fold to be held in position by that preceding it, giving no appreciable length of loose material between the fold being formed and the portion of the blank which is held. The true location of the folds along the blank is thus preserved. For the formation of sections of circular articles, the ends of the folding strips are guided along converging paths, as by being connected at their ends to spaced sets of carrier members slidable along converging guide means, these strips being of gradually decreasing length. There is means arranged to move the pairs of carrier members and their strips successively, as by slidable actuating members having opposite surfaces which contact with two sets of projections from the carrier members. Contact with one set produces the successive folding advance of the strips, and with the other set the retraction of the strips for the removal of the folded blank.

As another feature of the invention, a gage or gages are mounted at the ends of the carrier-strips, and by these the position of the blank upon the folding strips may be determined. To avoid interference with the strips as they fold a blank, there is means acting in the movement of the strips to carry the gages away from said strips. These gages are shown as yieldably mounted, and there is means movable with the strips for retracting the gages. A gage preferably has mounted upon it such means as a coverplate, capable of being moved into position to hold a blank upon the strips for folding, or being withdrawn therefrom for manipulation of the folded blank.

To cause their close approach to true arcuate form for their action upon circular articles, the folding strips are acted upon, as a feature of the invention, by auxiliary bending means which perfects their curvature, so they approach true arcs of circles. The strips decrease in length and radius of curvature in the direction of their folding advance, and there is means for changing the form of the strip of minimum radius and then transmitting this change successively to the other strips. As herein disclosed, each strip is connected at its ends to pins rotatable upon the carrier members. Arms upon the pins of the forward strip contact in their final advance with such means as a cam, so they rotate the pins to bend the strips in addition to their natural curvature. After this, the arms of succeeding pins successively contact with the arms previously rotated to bend the corresponding strips, this proceeding until finally the form of the strips is corrected throughout the series.

As a further feature of the invention, the folds of material, after they have been formed, are smoothed and their contour trued by a rectifying device movable into and out of active co-operation with the forming means by which the folded material is being held, this device being further movable along the folds to perfect their form. The rectifying or perfecting device preferably is provided with a comb or combs having teeth spaced to enter between the folds, and there is means to determine the position of the device with the teeth arranged to enter the spaces between the folds and for movement along said folds. For operation upon concentric folds, the teeth travel along concentric paths. In the arrangement shown herein, an arm is movable from one side of the forming means above said means, and through this arm a spindle is movable and carries a segment along which a pair of combs are guided. There is means for latching the arm with the guide-segment in the correct position above the forming means for the teeth of the combs to enter between the folds of material when the spindle is lowered, and means associated with the spindle for determining the depth of entrance of the teeth into the folds.

When an article is to be made up of folded sections, the fold-rectifying means just mentioned is movable, as a feature of the invention, into such final position that the teeth of the combs will serve as abutments for the ends of the section-folds. Two of the folding apparatus are mounted to move relatively to each other so cemented portions of the two folded sections may be pressed together, and the teeth at the end of their perfecting travel are located somewhat inwardly from the ends of the folds, so that they retain said ends in place as the joining pressure is being applied.

Figure 10:
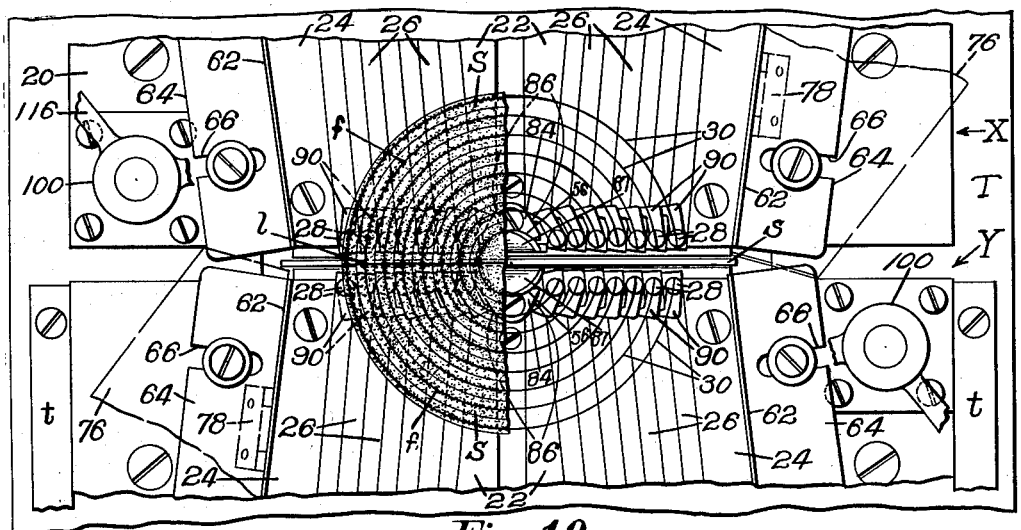
Figure 9:
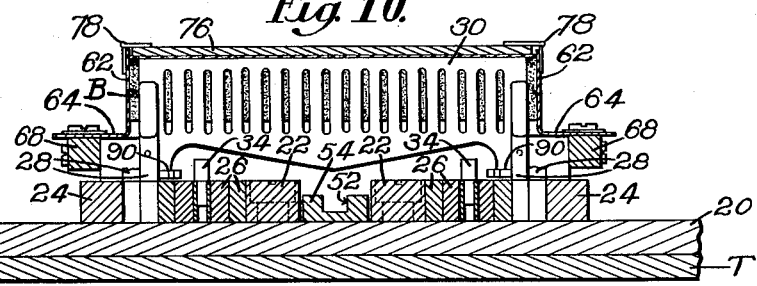
Figure 11:
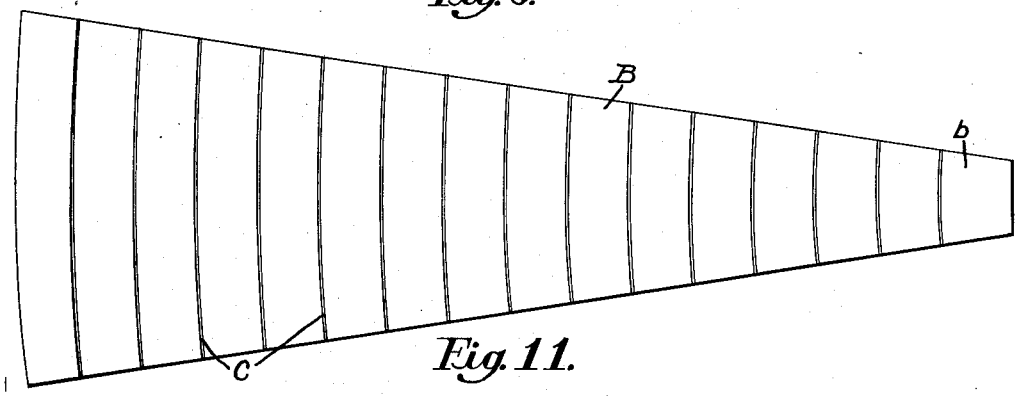
Figure 12:
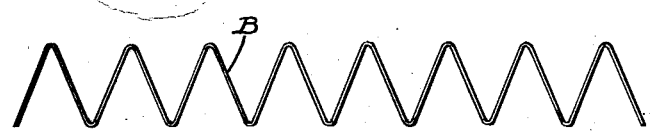
Figure 16:
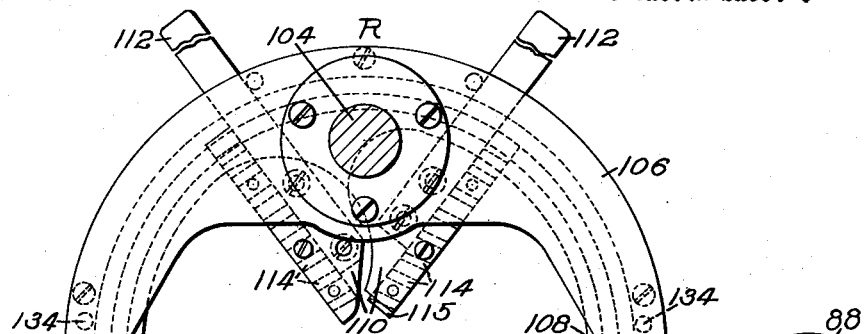
Figure 13:
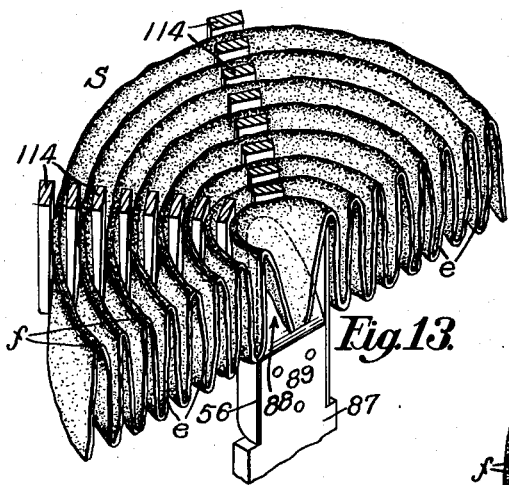
Figure 17:
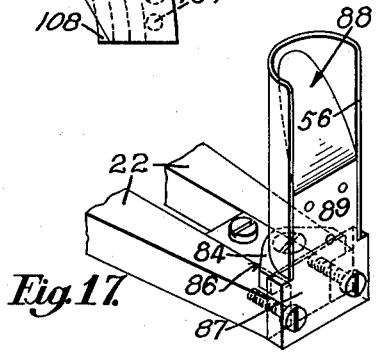
Figure 14:
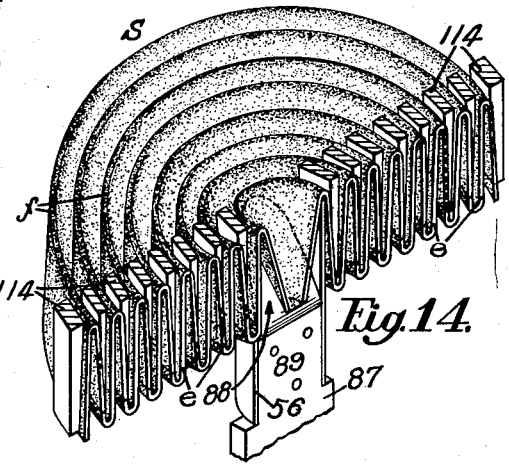
Figure 15:
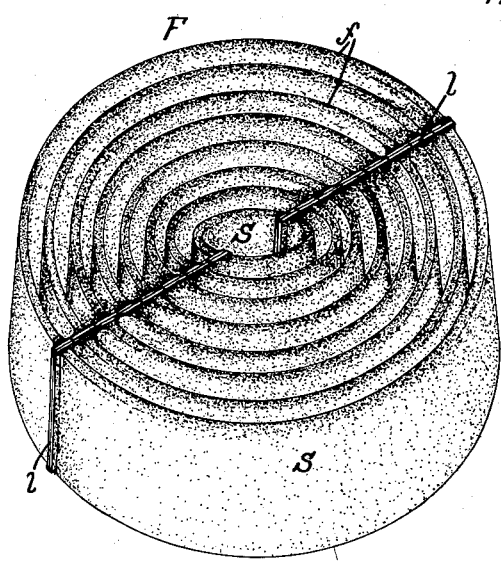

In the accompanying drawings illustrating one of several possible embodiments of the invention, Fig. 1 is a top plan view of our improved folding apparatus ready to receive material to be folded, parts being omitted;

Fig. 2, a similar view with the elements in folding relation;

Fig. 3, a perspective view of the apparatus ready for a folding operation;

Fig. 4, a vertical sectional view through the mounting for one end of a folding strip;

Fig. 5, a broken perspective of the positioning mechanism of the inner folding strip;

Fig. 6, a separated perspective of the rectifying combs and their mounting;

Fig. 7, a view similar to Fig. 3 but on a larger scale, showing a filter-section folded and with the combs in their final positions;

Fig. 8, a broken side elevation through the retaining plunger for the comb-mounting;

Fig. 9, a vertical section on the line IX—IX of Fig. 1;

Fig. 10, a top plan view of the co-operating ends of two of the apparatus, as assembled for the completion of a folded filter;

Fig. 11, a top plan view of a creased filter-blank;

Fig. 12, a side elevation of said blank which has been partially folded, ready for application to the forming apparatus;

Fig. 13, a perspective view of a folded filter-section with the combs ready for their rectifying action;

Fig. 14, a like view with the combs in their final retaining positions for the joining of the filter-sections;

Fig. 15, a perspective view of the completed filter;

Fig. 16, a top plan view of the combs in their initial positions upon their mounting; and Fig. 17, a perspective view of the forward abutment member.

At each side of an elongated base-board 20 opposite pairs of inner guide members 22, 22 and outer guide members 24, 24 are secured, the members 22 and 24 of each pair being parallel to each other and the pairs converging as they approach the forward end of the base. In the guideways furnished by the members 22, 24 are arranged to slide sets of parallel carrier members 26, 27. Arranged to turn in the forward end of each carrier or slide is a vertical mounting pin 28. In their initial or normal positions (Fig. 1), the pins of each pair of slides correspondingly located in the sets will be at the same distance from the forward end of the base, and the successive pairs of pins will be separated longitudinally of the slides by substantially equal distances. Attached to each pair of pins is a flexible folding strip 30, which may be of thin sheet metal slotted vertically at 32 to facilitate bending (Fig. 4). On account of the convergence of the slides, the strips gradually decrease in length in the direction of the forward ends of the guideways and are curved rearwardly upon gradually increasing arcs. Rising from each slide is an advancing projection 34, these projections being spaced similarly to the strips, as initially positioned. Rearwardly from the advancing projections and arranged in a like manner when the strips are forward, the slides carry retracting projections 36.

The outer slide 27 of each set not only serves as a carrier but also as an actuating member. To it is attached an actuating arm 40, extending about the slides of the corresponding set. Each arm has a forward edge 42 for contact with the projections 34 and a rearward edge 44 for engagement with the projections 36. To move the actuating slides 27, 27, there is pivoted near the rear extremity of each a link 46, the two links converging forwardly to a handle 48 to which they are pivoted. Extending downwardly from the handle is a projection 50, arranged to travel in a groove 52 in a central guide-strip 54 attached to the base 20. When the handle is carried forward from the position of Fig. 1 to that of Fig. 2, the two actuating strips 27 are advanced and with them the rear folding strip 30. When this rear strip is in proximity to the next strip of the set, the edges 42 of the arms 40 come in contact with the projections 34 of the slides belonging to the next strip. These slides 26 are, therefore, carried forward, thus successively bringing in proximity to each other the folding strips from the rear to the front of the apparatus, this continuing until they assume the positions appearing in Fig. 2. The forward strip co-operates with an abutment-wall 56, hereinafter more particularly described. When the handle 48 is shifted rearwardly, the edges 44 of the arms 40 strike the projections 36 and restore the strips 30 to their initial spaced relation. The movement in this direction is limited by stop-arms 60, 60, fast upon the guide members 24, 24. Contact of the projections 36 with these arms determines the rearward positions of the strips.

Let it be assumed that the apparatus is to be employed for folding a section S (Figs. 13 and 14), which is one-half of a filter F (Fig. 15). Each completed section consists of a segment of 180° in angular extent, in which filter material, such as properly porous paper, is formed in successive folds $f$ uniformly spaced and decreasing to an inner fold of minimum diameter. In forming these folds, the material must not be broken, stretched or materially compressed. The end edges $e$ of the folds at the diameters of the two sections must be formed with sufficient accuracy that, when brought together, they will register, so they may be cemented to each other with some such adhesive as latex, indicated at $l$ in Fig. 15, insuring that the passage of gas can only be through the filter material. A blank B (Fig. 11), approaching in form a complete sector, has been cut from the filter-material and creased at $c$ along arcuate lines. The blank is given, manually, a preliminary partial folding at the creases, so it assumes the form appearing in Fig. 12, and is laid upon the strips 30 of the apparatus of this invention. The opposite apices of the partial folds lie, respectively, upon the strips and between said strips. The position of the blank is determined by opposite edge-gages 62, 62 in the form of vertical walls rising from horizontal plates 64, 64. These plates are shown as secured for angular adjustment by slot-and-screw connections 66 to bars 68 pivoted at 70 on the base 20, and upon which the gages are movable across the guideways. Expansion-springs 72 exert their force upon the bars to urge the gage-walls toward each other, so they lie along lines which will cause the blank, laid between them, to be correctly centered. As the slides 27 are moved forward as a result of actuation of the handle 48, fingers 74 upon the actuating arms 40 engage the inner sides of the bars 68, swinging the gage members outwardly to clear the path of the pins 28 and the strips 30. After the blank has been thus positioned on the folding strips, a cover-plate 76 is placed upon it, holding the folds against rising. As may best be seen in Figs. 3 and 7, the plate 76 may be hinged at 78 upon one of the gage-walls 62, so it may either be removed from the folding strips to permit the application of a blank (Fig. 7), or allowed to rest upon said blank to retain it for folding (Fig. 3). With the blank applied to the strips 30, as above indicated, centered by the gage-walls 62 and held against upward displacement by the plate 76, the handle 48 is moved forward, simultaneously shifting the actuating slides 27. These slides, which are directly connected to the rearward strip 30, carry this forward until it is close to the succeeding strip, closing the outer fold of the filter-section and at the same time exerting sufficient pressure upon the formed fold to hold the remainder of the blank against displacement, with the creases $c$ in their true relation to the strips. Continued movement of the handle successively folds, presses and so retains the filter-folds until all have been formed. The folding strips now lie along curves closely approximating arcs of 180°.

Were the positions of the strip-carrying pins 28 upon the slides 27 and 26 left uncontrolled, the curves of the filter-folds would considerably depart from true arcs, since the strips would bend but little at the extremities as compared with the centers. The ends of the folds of the filter-sections under these conditions would not register properly for joining, in the manner appearing in Fig. 15. This difficulty we overcome by imparting to each pin a positive rotation to a degree which will bring the ends of the strips to the desired arcuate form. Referring to Figs. 2, 5 and 10, there is secured to the base 20, just beyond the point where the end of the blank B will lie as determined by the gage-walls 62, and in line with the center of said blank, a double cam furnished by a block 84 having at its opposite sides rearwardly converging vertical surfaces 86, 86. For engagement with these cam-walls, each of the two pins 28 belonging to the forward folding strip has fast upon it an arm 90. As these pins are advanced by their slides 26, angular ends 92 of the arms will strike the surfaces 86 and be cammed out, turning the pins and bending the strips positively. By the proper inclination of the cam-surfaces, a close approach to a true arc may be obtained. Each arm 90 has at the inner side of the end 92 an inclined edge 94, and between its outer edge 96 and its end, a curved corner 98. As each of the successive pairs of pins 28 approaches the forward extreme of its travel, the edges 94 of their arms contact with the corners 98 of the pair of arms which preceded it, and have been set to position their strip. As the edges 94 ride over the corners 98 to the edges 96, the pins are turned similarly to the first pair and successively bring their strips to the desired curvature. When the strips 30 are restored to their initial positions by the retraction of the handle 48, the strips straighten, returning the arms to normal after they are freed from one another and from the cam 84.

Above the cam-block 84, secured to the forward ends of the guide members 22, 22, rises the abutment 56, previously mentioned. To the outer side of the block is attached a supporting member 87, the rear wall of which is semicircular, and secured about this curved wall is the similarly formed abutment-wall 56, the height of which is substantially that of the folding strips 30. This abutment is best illustrated in Fig. 17. The upper portion of the member 87 within the wall 56 is reduced, its forward face 88 being inclined upwardly and rearwardly, below this there being a vertical wall 89. When the blank B in the preliminarily folded form of Fig. 12 is placed upon the apparatus, its narrow extremity b extends over the face 88.

To smooth and true the folds which have been formed in the filter-sections, a rectifying device R is provided, this also serving as a retaining means during the joining of the sections. From the forward portion of the base 20 rises a vertical standard 100, upon which a carrier-arm 102 is mounted to turn from one side of the folding means (Fig. 3) to a position above said means (Fig. 7). Through a vertical bore in an enlargement 103 upon the free end of the arm, a spindle 104 is movable. Fast to the lower end of the spindle is a guide-segment 106, and in an arcuate way formed between the segment and a separable lower section 108 two comb-segments 110, 110 are movable by handles 112, 112. The outer ends of the comb-segments are enlarged and have secured to them sets of depending teeth 114 yoked together at 115. These teeth and their holder may be moved by rotation of the carrier-arm 102 between the inactive relation illustrated in Fig. 3, and one in which they are brought into co-operation with the folds of a formed filter (Fig. 7). A second arm 116 turning with the arm 102 carries a spring-actuated latch 118 for engagement with a post 120 upon the base, this releasably retaining the rectifying device R above the folding means. This position of the rectifying device is more exactly determined by a stop-screw 122 threaded through the arm 116 for contact with the post 120. The device R may be held at either of two vertical levels, one for movement upon the standard 100 into and out of its active relation and the other for its operation upon a filter-section. A spring-actuated plunger 124 (Fig. 8) is movable through a horizontal bore in the arm-enlargement 103, it being urged by its spring into a slot 126 extending longitudinally of the spindle. In the inner wall of the slot at the lower extremity is a depression 128, which receives the plunger and holds the device R elevated for transfer horizontally between positions. With the device latched above the folding mechanism and a hand-hold 130 on the upper end of the spindle grasped by the operator, the plunger 124 is withdrawn and the device lowered until the upper end-wall 132 of the slot 126 rests upon the plunger. Then, as best shown in Figs. 7 and 14, the points of the teeth 114 lie between the filter-folds and outside the outer walls of said folds, with their points somewhat above the lower ends of the folds. The connecting yokes of the teeth are spaced from the top of the filter-section. Preferably, the combs are located initially inwardly from the diametrical side of the section, as appears in Fig. 13. The operator, manipulating the handles 112, swings the combs forwardly until they are stopped by pins 134, 134, set in the segment-section 108 and which the handles engage. The teeth are now close to the open ends of the folds but these project somewhat (Fig. 14). Said teeth are sufficiently thick, as compared with the spaces between the folds, to exert upon these some lateral pressure. This ensures that in the movement of the combs the walls of the folds will be separated from one another, and the filter-material quite uniformly smoothed, there resulting a symmetrical form and one in which all the material will be effective for the filter-action. When the rectifying operation, and the joining of the two filter-sections as described below, have been completed, the spindle 104 is raised by the hand-hold 130, so the plunger 124 is again urged by its spring into the depression 128. With the latch 118 released, the device may be returned to its inactive position.

In connection with the following description of the means for joining two of the filter-sections S, S to furnish the complete filter F, an outline will be given of the operations necessary to form a section. As is illustrated in Fig. 10, a folding apparatus X and a folding apparatus Y are placed with their forward ends in close proximity to each other. The base of the apparatus X may be secured to a support T, while the base of the apparatus Y is arranged to slide toward and from its companion in ways t, t. Between the spaced ends of the bases, a horizontal stripper-bar s is guided for vertical movement. Upon each apparatus there is performed the operation of producing a folded filter-section S, this being the same for both. With the handle 48 drawn back, as appears in Fig. 1, the retracting projections 36 are against the stop-arms 60, where they have been carried by the edges 44 of the actuating arms 40. The folding strips 30 are spaced from one another ready for the operation. The gage-walls 62 are held in by their springs 72, at such an angle and so separated from each other that they determine the space in which a work-piece is to be applied to the apparatus. The rectifying device R is raised and swung clear of the folding means. A blank B of filter-material is partially, but not necessarily exactly, folded at its creases c and deposited upon the strips 30 between the gage-walls, the lower apices of the folds descending between said strips and the upper apices resting upon the strips. The blank-portion b lies within the curve of the abutment-wall 56. The cover-plate 76 is turned in upon its hinges, so it rests upon the upper apices to hold the blank initially against upward displacement. Now, the handle 48 is carried forward along the guide 54, this first actuating the slides 27 and thereafter the slides 26, as a result of the engagement of the edges 42 of the arms 40 with the projections 34. Starting with the rearward strip, these strips are successively shifted into co-operation with the next strip of the series to press each fold f of the blank between them, and to hold it against displacement while the succeeding fold is acted upon. Due to the convergence of the slides as the strips advance, these strips become more and more curved, and, with the action of the cam-block 84 upon the arms 90 of the forward strip-mounting pins 28 and these arms upon one another, the final curvature approximates a true arc of 180°. As the blank is being formed by the strips, the fingers 74 carried by the actuating arms 40 remove the gage-walls 62 from interference with the folding means.

The rectifying device R has been resting at one side of the folding means, held elevated above this by the plunger 124. With the cover-plate 76 turned back, the device is swung in and latched to the post 120, the teeth 114 of the combs being at their inner or most closely adjacent positions and registering with the folds f of the blank between adjacent strips. The operator releasing the comb-spindle 104 from the plunger lowers the comb-teeth into the filter-folds, and by the handles 112 swings them outwardly to smooth and perfect the form. The teeth do not reach the ends of the folds, so a portion is capable of being laterally bent over these as abutments. The converging end b of the blank lies within the abutment-wall 56 and above the wall 88. If necessary, this end is pressed downwardly and inwardly by the operator to increase its concavity. The same operations having been performed at the apparatus X and Y, the opposed edges e of the two filter-sections S are coated with the chosen adhesive l, and the apparatus Y carried in until these registering edges of the two sections are pressed together. Under this pressure, the section-edges projecting beyond the comb-teeth and beyond the edges of the wall 56 are deflected laterally, increasing the cemented area. The ends of the blank-portions b extend over the vertical walls 89 of the support 87, so they are forced firmly together. The completed filter is raised from the folding strips 30 upon elevation of the stripper s and removed from the apparatus. The handle 48 is retracted and the slides 26 and their strips returned to their initial positions by contact of the arm-edges 44 with the projections 36. The actuating slides 27 effect the return of the rearward strip. The fingers 74 release the gage-walls 62, and the apparatus is ready for the production of another filter.

Having described our invention, what we claim as new and desire to secure by Letters Patent of the United States is:

1. Folding apparatus comprising a series of strips spaced from each other to receive between them portions of material to be folded, movable means for supporting the strips, means for successively moving the supporting means and the strips to press the material received between the strips, and means for causing the strips to assume an arcuate form during their movement.

2. Folding apparatus comprising opposite guide means converging toward each other, a set of carrier members slidable in each guide means, a series of strips of gradually decreasing length connected at their opposite ends to pairs of carrier members of the two sets and being spaced from one another longitudinally of the carrier members, and means arranged to move the pairs of carrier members with their strips successively in the direction of convergence of the guide means to form between them one by one folds of applied material.

3. Folding apparatus comprising spaced guideways converging toward each other, a set of carrier members slidable in each guideway, flexible folding strips connected to the forward ends of the pairs of carrier members correspondingly arranged in the two sets, said strips being spaced successively from one another and increasing in length from front to rear of the apparatus, a projection from each carrier member, said projections being spaced from one another similarly to the strips, and an actuating member movable in each guideway and provided with a surface for successive contact with the projections to move the carrier members.

4. Folding apparatus comprising spaced guideways converging toward each other, a set of carrier members slidable in each guideway, flexible folding strips connected to the forward ends of the pairs of carrier members correspondingly arranged in the two sets, said strips being spaced successively from one another and increasing in length from front to rear of the apparatus, two projections from each carrier member, and an actuating member movable in each guideway and provided with a portion extending between the projections of each carrier member and contacting therewith to move the carrier members in opposite directions.

5. Folding apparatus comprising spaced guideways, a set of carrier members slidable in each guideway, folding strips connected to the forward ends of the pairs of carrier members correspondingly arranged in the two sets, said strips being spaced successively from one another, a projection from each carrier member, said projections being spaced from one another similarly to the strips, an actuating member movable in each guideway and provided with a surface for successive contact with the projections to move the carrier members, an intermediate guideway, and means movable along the intermediate guideway and arranged to move the actuating members.

6. Folding apparatus comprising a series of movable flexible folding strips to which a blank may be applied for folding, means for supporting and moving the strips toward one another to form between them folds of the applied blank, gages for the blank extending along the ends of the strips, and means acting in the movement of the strips for moving the gages away from the strips.

7. Folding apparatus comprising a series of flexible folding strips of gradually decreasing length to which a blank may be applied for folding, means for supporting and moving the strips toward one another to form between them folds of the applied blank, pivoted bars extending along the ends of the strips, gage-walls for the blank carried by the bars, springs acting upon the bars to force the gage-walls toward the ends of the strips, and means movable with the strips and acting upon the bars to retract the gage members.

8. Folding apparatus comprising opposite guide maens converging toward each other, a set of carrier members slidable in each guide means, a series of strips connected at their opposite ends to pairs of carrier members of the two sets and being spaced from one another longitudinally of the carrier members, means arranged to move the pairs of carrier members with their strips successively in the direction of convergence of the guide means to form between them one by one folds of material applied to the strips, gages extending along the ends of the strips and being yieldably mounted to move across the guide means from and toward the strips, and means movable with the carrier members for retracting the gages.

9. Folding apparatus comprising a series of folding strips to which a blank may be applied for folding, means for supporting and moving the strips toward one another to form between them folds of the applied blank, a gage extending along the ends of the strips for positioning the blank upon the strips, and means mounted upon the gage and being movable thereon to hold the blank upon the strips for folding or to be withdrawn therefrom.

10. Folding apparatus comprising a series of flexible folding strips of gradually decreasing length to which a blank may be applied for folding, means for supporting and moving the strips toward one another to form between them folds of the applied blank, a movable gagewall extending along the ends of the strips, and a coverplate pivoted upon the gage-wall and movable into and out of engagement with a blank upon the strips.

11. Folding apparatus comprising a series of spaced flexible strips between which material may be received for folding, means for mounting the strips for movement toward one another in the general form of arcs of gradually decreasing radii, and means acting upon the strips as they approach their final folding positions for bending their ends to perfect their arcuate form.

12. Folding apparatus comprising a series of spaced flexible strips between which material may be received for folding, means for mounting the strips for movement toward one another in the general form of arcs of gradually decreasing radii, means acting upon the strip of minimum radius for changing its form, and means for transmitting the change of form successively to the other strips.

13. Folding apparatus comprising opposite guide means converging toward each other, a set of carrier members slidable in each guide means, a pin rotatable upon each carrier member, a series of flexible strips connecting the pins of pairs of carrier members in the two sets and being spaced from one another longitudinally of the carrier members, means arranged to move the pairs of carrier members with their strips successively in the direction of convergence of the guide means to bend them, means for rotating the pins of one strip to further bend it, and means whereby each pair of pins thereafter rotates the pair of pins of the succeeding strip to bend it.

14. Folding apparatus comprising opposite guide means converging toward each other, a set of carrier members slidable in each guide means, a pin provided with an arm and being rotatable upon the forward end of each carrier member, a series of flexible folding strips connecting the pins of pairs of carrier members of the two sets and being spaced from one another longitudinally of the carrier members, means arranged to move the pairs of carrier members with their strips successively in the direction of convergence of the guide means and to bend them concentrically to generally arcuate form, and a cam with which the pin-arms of the inner strip contact to rotate the pins of said inner strip and further bend said strip, the pin-arms of the succeeding strips of the series successively contacting with the arms previously rotated to turn each pair of arms and bend the corresponding strip.

15. Folding apparatus comprising means for forming material in successive concentric folds, an arm movable from a position at one side of the forming means into active co-operation therewith, a segmental guide member movable upon the arm toward and from the forming means, and a pair of toothed members movable upon the guide member and arranged to enter between the folds and to move along said folds.

16. Folding apparatus comprising means for forming material in successive concentric folds, an arm movable from a position at one side of the forming means into active co-operation therewith, means for retaining the arm in a predetermined relation to the forming means, a spindle movable through the arm between two extreme positions, a guide-segment fixed to the spindle, and combs movable along the guide-segment and arranged to enter between and be moved along the folds in one extreme position of the spindle.

17. Folding apparatus comprising means for forming material in successive concentric folds, an arm movable from one side into a position above the forming means, a latch for holding the arm in a predetermined position above the forming means, a spindle movable through the arm and being provided with a slot, a plunger movable through the arm and entering the slot, a guide-segment fixed to the spindle, opposite comb-segments movable from and toward each other in the guide-segment and having teeth arranged to enter betwen the folds of material, handles projecting from the comb-segments, and stops carried by the guide-segment and limiting the extent of movement of the comb-segments.

18. In combination, two forming apparatus on each of which a section of a folded article may be formed, the two apparatus being arranged for relative movement toward and from each other to effect the joining of the ends of the folds of the two sections, and form-perfecting devices having portions movable along the folds of sections and into positions in which they furnish abutments for the ends of the section-folds.

19. In combination, two forming apparatus on each of which a section of a folded article may be formed, the two apparatus being arranged for relative movement toward and from each other to press together the ends of the folds of the two sections to effect their connection, and teeth movable along the folds of each section to points spaced inwardly from the ends of the fold-sections to furnish abutments for said ends when they are under pressure.

20. In combination, two forming apparatus on each of which a section furnishing half of a circular article may be formed in concentric folds, one apparatus being fixed and the other guided for movement toward and from its companion to press together the ends of the folds at the diameters of the two sections to effect their connection, pairs of combs having teeth movable oppositely along the folds of the sections to perfect their form, and means for stopping the movement of each comb at a position inwardly from the ends of the section-folds to furnish abutments for said ends when under section-joining pressure.

21. Folding apparatus comprising means for forming material in successive predeterminately spaced folds, a comb-like, fold-perfecting device movable into proximity to and along the forming means, said device having teeth spaced to conform to the spacing of said folds, and means for guiding said device for movement along the folds.

References Cited in the file of this patent

UNITED STATES PATENTS

| | | |
|---|---|---|
| 1,085,948 | Smith | Feb. 3, 1914 |
| 1,551,903 | Novick | Sept. 1, 1925 |
| 1,877,359 | Morin | Sept. 13, 1932 |
| 2,326,967 | Poelman | Aug. 17, 1943 |

FOREIGN PATENTS

| | | |
|---|---|---|
| 2,253 | Great Britain | 1863 |